(12) United States Patent
Huntelmann et al.

(10) Patent No.: US 8,807,451 B2
(45) Date of Patent: Aug. 19, 2014

(54) APPARATUS FOR APPLYING FERTILISER IN STRIPS

(75) Inventors: Karl-Heinz Huntelmann, Loningen (DE); Guido Elbers, Essen (DE)

(73) Assignee: Hugo Vogelsang Maschinenbau GmbH, Essen (DE)

( * ) Notice: Subject to any disclaimer, the term of this patent is extended or adjusted under 35 U.S.C. 154(b) by 0 days.

(21) Appl. No.: 13/885,197

(22) PCT Filed: Nov. 7, 2011

(86) PCT No.: PCT/EP2011/069528
§ 371 (c)(1),
(2), (4) Date: May 14, 2013

(87) PCT Pub. No.: WO2012/065871
PCT Pub. Date: May 24, 2012

(65) Prior Publication Data
US 2013/0233214 A1    Sep. 12, 2013

(30) Foreign Application Priority Data

Nov. 15, 2010   (DE) .................... 20 2010 015 383 U

(51) Int. Cl.
*A01C 23/00* (2006.01)
*B05B 3/18* (2006.01)
*B05B 13/02* (2006.01)
*A01B 73/06* (2006.01)
*A01C 23/04* (2006.01)
*B05B 13/00* (2006.01)
*B05B 13/04* (2006.01)

(52) U.S. Cl.
CPC ............. *A01B 73/06* (2013.01); *A01C 23/008* (2013.01); *A01C 23/047* (2013.01); *B05B 3/18* (2013.01); *B05B 13/005* (2013.01); *B05B 13/04* (2013.01)

USPC ............ 239/147; 239/163; 239/166; 239/172

(58) Field of Classification Search
CPC .... A01B 73/06; A01B 73/062; A01B 73/065; A01B 73/067; A01B 73/02; A01B 73/005; A01B 73/00; A01B 73/04; A01B 73/044; A01B 73/046; A01B 73/048; A01B 15/14; A01B 23/04; A01B 25/00; A01B 49/06; A01B 49/04; A01B 79/02; A01B 79/005; A01B 79/00; A01C 23/00; A01C 23/001; A01C 23/006; A01C 23/008; A01C 23/02; A01C 23/021; A01C 23/022; A01C 23/023; A01C 23/024; A01C 23/025; A01C 23/027; A01C 23/028; A01C 23/04; A01C 23/047; A01C 3/00; A01C 3/06; A01C 3/063; A01C 7/208; A01C 7/20; A01C 15/00; A01C 15/003; A01C 15/005; A01C 17/00; A01C 17/001; A01C 17/003; A01C 21/00; A01C 21/002; A01C 21/005; B05B 1/00; B05B 3/18; B05B 3/00; B05B 13/005; B05B 13/00; B05B 13/02; B05B 13/04

USPC ............... 111/118, 127, 8, 9, 14, 52–66, 170, 111/174, 200, 900, 925, 926, 927; 172/1, 172/240–244, 307, 311, 452–484, 488, 172/776; 239/146, 147, 159, 163, 164, 239/166–169, 172, 175, 176, 722, 302
See application file for complete search history.

(56) References Cited

FOREIGN PATENT DOCUMENTS

| | | |
|---|---|---|
| DE | 4217375 A1 | 12/1993 |
| DE | 20017937 U1 | 11/2001 |
| DE | 10339162 A1 | 3/2005 |
| DE | 202007011631 U1 | 11/2007 |
| DE | 202008015564 U1 | 3/2009 |
| EP | 0571794 A1 | 12/1993 |

OTHER PUBLICATIONS

Search Report dated Sep. 16, 2011 in German Patent Application No. 202010015383.2.
International Search Report dated Feb. 24, 2013 in Application No. PCT/EP2011/069528.

*Primary Examiner* — Christopher J Novosad

(74) *Attorney, Agent, or Firm* — Kilpatrick Townsend & Stockton LLP; Dean W. Russell, Esq.; Kristin M. Crall, Esq.

(57) ABSTRACT

Embodiments of the invention relate to an apparatus for discharging a fertilizer in strips onto agriculturally productive land by trailing hoses, which apparatus is designed for installing on the rear of a tank vehicle, with two jibs which can each be pivoted to and fro about a vertical axis (A1, A2) between a discharge position and a transport position. Certain embodiments relate in particular to an apparatus of this type which has a supporting device which is arranged on the apparatus so as to be pivotable about a vertical axis (B) and is designed, in the transport position, to support the jibs in relation to the carriageway in a supporting section spaced apart from the axis (B). Embodiments also relate to a tank vehicle with an apparatus of this type.

18 Claims, 3 Drawing Sheets

APPARATUS FOR APPLYING FERTILISER IN STRIPS

Figure 1:
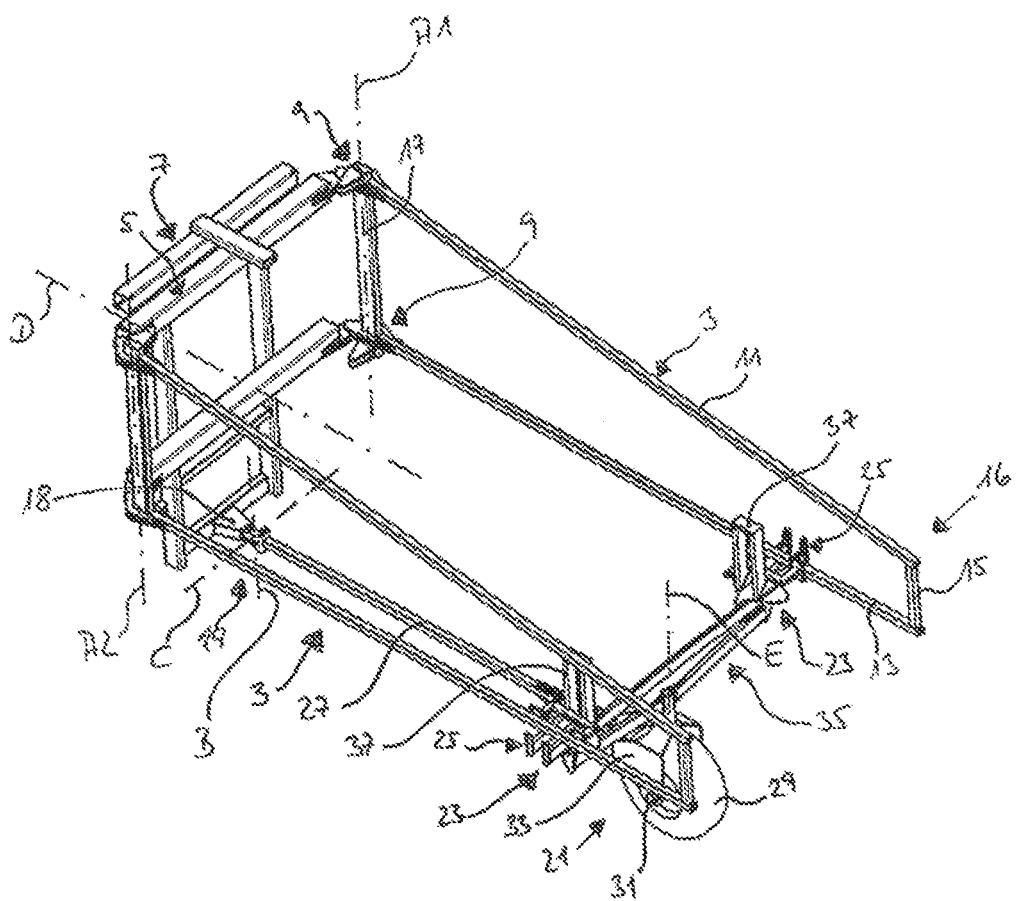

This application is the U.S. national phase of International Application No. PCT/EP2011/069528 filed on Nov. 7, 2011, which application claims priority to German Patent Application No. 202010015383.2 filed on Nov. 15, 2010, the contents of both of which are incorporated herein by reference.

The present invention concerns an apparatus for applying a fertiliser in strips to agriculturally productive surfaces by means of trailing hoses, with two booms which are each reciprocatingly pivotable about a respective vertical axis between a discharge position and a transport position.

Apparatuses of the above-indicated kind are usually employed for environmentally friendly distribution of organic suspensions such as for example liquid manure to agriculturally productive surfaces. The above-mentioned apparatuses provide for application near the ground so that the distribution of ammonia in the ambient air is diminished. The discharge of fertiliser by means of trailing hoses has proven its worth, even on ground covered with growth. The trailing hoses are to be mounted in known manner to the apparatuses for the discharge of the fertiliser.

To achieve an application width which is as large as possible in the discharge operation the booms mounted to the apparatus are reciprocatingly pivotable between a transport position and a discharge position. In the discharge position the booms are laterally spread relative to the direction of travel of the apparatus. A maximum application width is achieved in the condition of a spread at a right angle to the direction of travel or the longitudinal direction of the vehicle. The pivotal movement is preferably about a vertical axis. In this respect vertical orientation is used to denote a substantially perpendicular orientation of the pivot axis relative to the ground on which the apparatus is travelling or a perpendicular orientation relative to an apparatus structure assumed to be horizontal.

To bring the apparatus to its intended location for discharge of the fertiliser it is often necessary to move the apparatus over public roads or service or forest roads or tracks. Consequently the apparatus for the discharge of fertiliser cannot remain in its discharge position during transportation.

Tankers pulled by tractors provide in known manner pivotable booms which for transport purposes are folded from the laterally spread discharge position forwardly to the sides of the tanker. It will be noted however that in the case of so-called self-propelled vehicles—vehicles with their own drive and a short tank on a unitary vehicle structure—such a pivoting arrangement cannot be implemented by virtue of the great vehicle width.

DE 200 17 937 U1 discloses a linkage apparatus for a distributor vehicle which is adapted for discharging fertiliser in strips on agriculturally productive surfaces by means of trailing hoses and which has two booms which are respectively movable about a vertical axis between a discharge position and a transport position behind the tanker in such a way that a maximum width of 3 m behind the tanker is observed. The publication proposes arranging a left-hand boom and a right-hand boom at two pivotal arms of differing lengths behind the tank and pivoting them through 180° in each case from a transport position into the discharge position and back.

It will be noted however that it is only possible to achieve discharge widths of up to 9 m with the solution proposed there. In addition the solution proposed there requires an increased number of parts. Furthermore the left-hand and right-hand booms cannot be pivoted at the same time as one boom covers the other in the transport position.

Consequently the object of the invention was to provide an apparatus of the kind set forth in the opening part of this specification, which permits a greater discharge width and which at the same time ensures good handleability of the apparatus in the transport mode.

The object of the invention is in one embodiment attained by a support device which is arranged on the apparatus pivotably about a vertical axis and is adapted to support the booms in the transport position in relation to the carriageway in a support portion spaced from the axis. The invention makes use of the realisation that the provision of a support device on the apparatus affords the possibility of moving the booms into a transport position in which the booms are pivoted precisely rearwardly without having to be moved into mutually nesting relationship.

An advantageous development of the invention provides that the support device has a towbar pivotable about the vertical axis and in the support portion has one or more support wheels, the direction of travel of which is substantially parallel to a towing direction of the towbar. Such an orientation of the support wheels ensures that in operation of the apparatus, at any event in forward travel of the apparatus, the support device trails the vehicle in a substantially true tracking relationship. The one or more support wheels follow the movement which is predetermined by the towbar. As the support device also supports the booms the booms which are pivoted rearward in relation to the support device in the transport position also follow the direction of movement predetermined by the apparatus when negotiating curves. The apparatus in the transport position, being supported by means of the support device, has a travel characteristic comparable to a single-axle trailer. Preferably the towbar is connected at a first end portion to a carrier frame of the apparatus. In addition preferably the support portion is disposed at a second end portion of the support device, that is in opposite relationship to that end portion, so that no unnecessary projection of the apparatus remains beyond the support portion or the support wheel or wheels and swinging out when negotiating a curve is minimised. That improves the handleability in the transport mode of operation. In a particularly preferably embodiment the support wheel or wheels are not driven.

In a preferred embodiment of the invention the support device for each of the two booms has a respective supporting means for the transmission of the force due to weight of the booms to the one or more support wheels.

Preferably the supporting means of the two booms are mounted to a transverse carrier which is oriented substantially parallel to a plane in which the axes of the booms lie. Because the transverse carrier is oriented substantially parallel to the plane of the axes of the booms the booms are moved with a trapezoidal configuration when the vehicle is negotiating a curve.

It is particularly preferred if in the transport position the two booms are arranged substantially parallel to each other. In that case, while the vehicle is negotiating a curve, with the mounted apparatus in the transport position, the booms perform a parallelogram-like movement relative to each other.

An advantageous development of the apparatus according to the invention provides that the booms are movable in respect of height by means of a lifting device and in the transport position can be brought into contact with the respective supporting means by means of a lowering movement. As a counterpart the booms are moved out of contact with the respective supporting means by means of being lifted and can then be pivoted from the transport position into the discharge position. Preferably the supporting means respectively have arresting elements with which the booms can be brought into engagement in the transport position by means of a lowering movement. The arresting elements prevent lateral unintentional disengagement of the booms from the support device of the apparatus. The arresting elements preferably have U-shaped holding portions and/or optionally further latching elements such as for example hooks or clamping elements. The arresting elements are preferably adapted to prevent unintentional lateral pivotal movement of the booms by means of substantially vertically provided guide elements. The risk in that respect arises in particular when, because of unevenness in the ground on which the apparatus is travelling, the height of the booms changes relative to the support device and in particular the respective supporting means. The guide elements are adapted to move the booms back to the supporting means again. When a U-shaped holding portion is involved the two limbs of the U-profile preferably serve as guide elements.

In a further preferred embodiment of the apparatus according to the invention the support device is mounted pivotably about a horizontal axis in the end portion. Because the support device permits a change in the angle of the towbar as a consequence of the pivotability about the horizontal axis unevenness on the carriageway such as for example compressions or humps in the terrain are compensated for while travelling. A development of this preferred embodiment provides that the support device is pivotable about the horizontal axis in such a way that the support device comes out of contact with the ground. Particularly preferably the support device is pivoted into a substantially vertical position when the booms are outside the transport position. That is advantageous in particular if the booms are in the discharge position or on the way to the discharge position.

In the discharge position in a further advantageous embodiment of the invention the booms are pivotable about a horizontal axis. The horizontal axis is preferably oriented in the longitudinal direction of the apparatus so that a pivotal movement of that axis reduces the height of the right-hand boom relative to the ground on which the apparatus is standing, wherein at the same time the height of the oppositely disposed boom relative to the ground there is increased. An inclined position of the apparatus, for example because of wheels which have sunk in to different depths, is compensated for. In that case the pivotability of the axis should preferably be +/−10° relative to the horizontal and should be steplessly adjustable.

Preferably the booms are respectively mounted to a pivotal frame pivotably about the vertical axis. Preferably the pivotal frame is mounted to a carrier frame pivotably about a horizontal axis. The horizontal axis about which the pivotal frame is mounted pivotably to the carrier frame is preferably the same axis as that about which the booms are horizontally pivotable in the discharge position.

In an alternative embodiment the booms are mounted pivotably separately from each other about a respective horizontal axis or about the same horizontal axis into the discharge position. The provision of the pivotal frame is viewed as advantageous as that provides a mechanical common connection to the rest of the apparatus.

In a further advantageous embodiment the lifting device is provided on a tank vehicle and the carrier frame is adapted for mounting to the lifting device of the tank vehicle. Because the lifting device is already provided on the tank vehicle the structure of the apparatus according to the invention is overall simplified and the inherent weight in that respect is reduced.

For heightwise mobility of the booms the entire carrier frame is moved in respect of height by the lifting device provided on the tank vehicle.

Although the entire carrier frame is moved in respect of height the supporting part of the support device, for example the support wheel, remains on the ground by virtue of the pivotability of the support device about the horizontal axis. Only the carrier frame and further parts connected thereto are lifted. In accordance with preferred embodiments this can be the pivotal frame and/or the pivotably mounted booms.

Alternatively the lifting device is provided on the carrier frame and the pivotal frame is movable in respect of height relative to the carrier frame by means of the lifting device. This is particularly advantageous in the case of vehicles without their own lifting device. In the case of vehicles which are themselves already provided with a lifting device it will be appreciated however that an additional lifting device further increases the amount and freedom of movement in heightwise adjustment although a greater weight and a higher degree of complexity in the control have to be accepted.

In a further advantageous embodiment the booms respectively have a prolongation segment which is arranged at an end portion of the respective boom reciprocatingly pivotably between a transport position and a discharge position. The prolongation segment is preferably fixed pivotably about a horizontal axis to the end portion of the respective boom and in the transport position is pivoted through 180° forwardly in the direction of travel. In the discharge position the respective prolongation segment is pivoted out of the transport position into the discharge position, thereby achieving a further increase in the application width.

In still a further preferred embodiment of the invention the transverse carrier is adapted to be adjustable in respect of height. In that way the heightwise carrier is adapted to compensate for a change in height occurring for example because of unevenness in the carriageway in respect of the booms relative to the respective supporting means, by the transverse carrier providing for tracking adjustment with the supporting means by a heightwise displacement. The heightwise displacement is preferably effected with spring support or by motor means.

Figure 2:
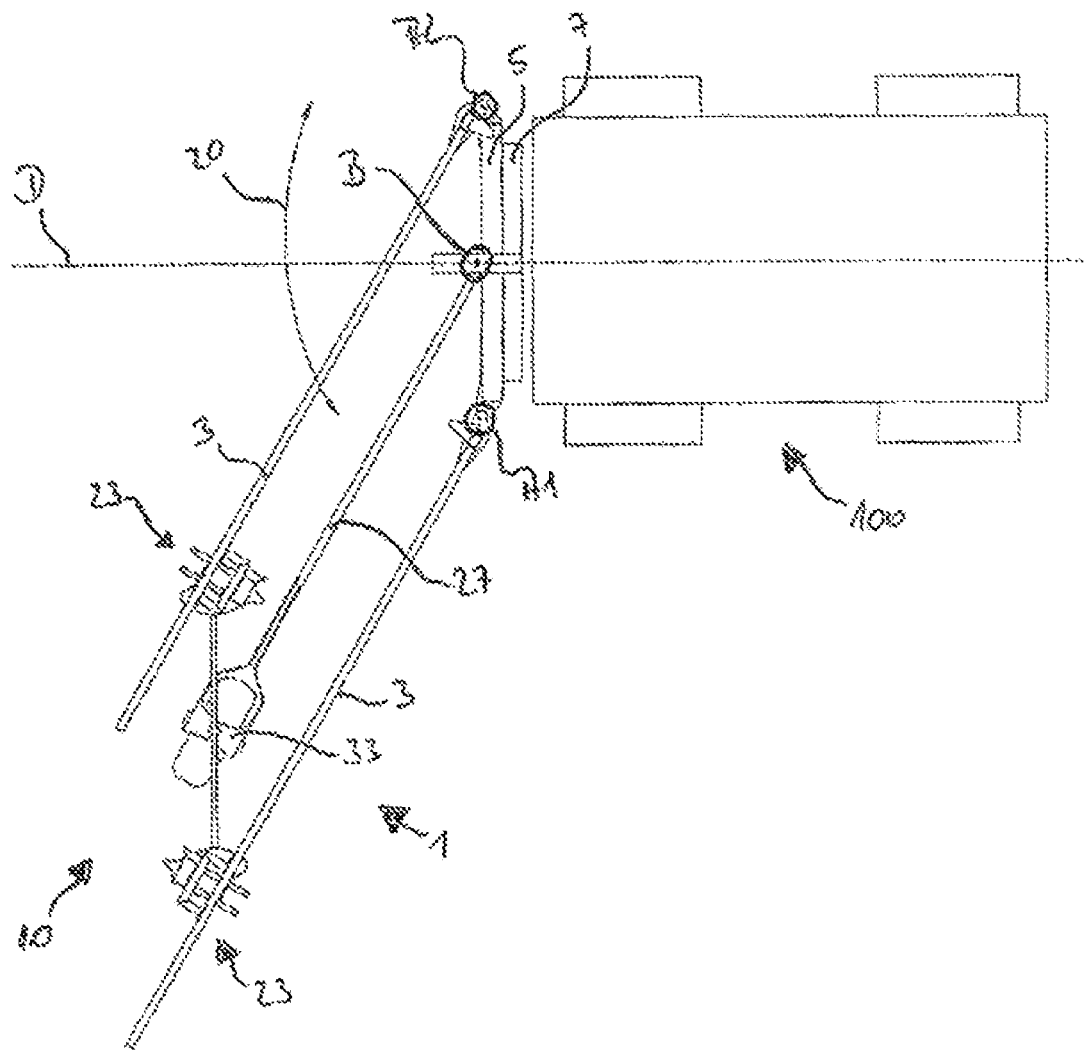
Figure 3:
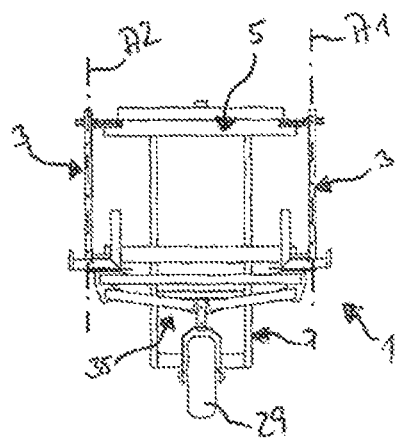
Figure 4:
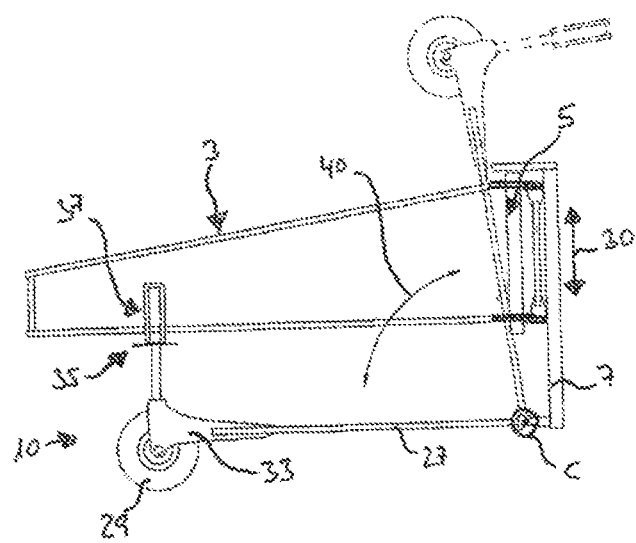

The invention is described in greater detail hereinafter by means of preferred embodiments and with reference to the accompanying Figures in which:

FIG. 1 shows a perspective view of a preferred embodiment of the apparatus according to the invention, FIG. 2 shows a diagrammatic side view of a tank vehicle together with the apparatus according to the invention in a preferred embodiment, FIG. 3 shows a side view of the apparatus according to the invention as shown in FIGS. 1 and 2, and FIG. 4 shows a further side view of the FIG. 3 apparatus.

FIG. 1 shows a diagrammatic perspective view of the apparatus according to the invention for the discharge of fertiliser. The apparatus 1 has two booms 3, of which a boom 3 is mounted to a pivotal frame 5 pivotably about a vertical axis A1. The second boom 3 is mounted to the pivotal frame 5 pivotably about a vertical axis A2. The two booms 3 are identical in structure so that only one of the booms has reference numerals. The booms 3 each have an upper and a lower mounting portion 9. A first vertical strut 17 extends between the respective mounting portions 9. The vertical strut 17 forms an end of the booms 3, that is near the vehicle. Arranged at the end of the respective boom 3, that is opposite to the respective strut 17, is a respective second vertical strut 15. The second vertical strut 15 and the first vertical strut 17 are substantially parallel to each other. The second vertical strut 15 is shorter than the first vertical strut 17 so that the boom 3 is overall of a trapezoidal configuration. In this case a lower horizontal strut 13 is oriented substantially horizontally while an upper horizontal strut 11 is oriented to fall away in the direction of the second vertical strut 15.

The pivotal frame 5 is mounted to a carrier frame 7 pivotably about a horizontal axis, indicated by reference D. The carrier frame 7 can be mounted to a tank vehicle (not shown in FIG. 1). The axis D extends substantially in the longitudinal direction of the tank vehicle and substantially at a right angle to the axes A1 and A2. Arranged at a region near the ground in the mounted condition of the apparatus is a receiving means 18 which can be coupled to a towbar 27. A towbar 27 coupled thereto is shown in FIG. 1. The towbar 27 is pivotable about the vertical axis B relative to the carrier frame 7 of the apparatus 1. The connection between the receiving means 18 and the towbar 27 is arranged in an end portion 19 of the towbar 27. Disposed at a spacing from the end portion of the towbar is a support portion 21. The support portion 21 and the towbar 27 are part of a support device 10.

The support device 10 has a support wheel 29 in the support portion 21. The support wheel 29 is mounted in a wheel box 33 by means of an axle 31. The wheel box 33 is arranged at an end of the towbar 27, opposite to the end portion 19. A transverse carrier 35 is arranged on the wheel box 33. Two supporting means 23 are arranged on the transverse carrier 35 substantially symmetrically on both sides of the wheel box. The supporting means 23 are adapted to receive a respective boom 3. In FIG. 1 the booms 3 are each in the transport position and in engagement with the supporting means 23 and are supported thereby.

Arranged on the supporting means 23 respectively are one or more arresting elements 25 which hold the horizontal strut 13 of the respective boom 3 arrested in the transport position. In addition at least one respective vertically oriented guide element 37 is provided on the supporting means. The at least one guide element 37 is adapted to guide a respective boom 3 which is displaced in respect of height, to prevent unintentional lateral pivotal movement thereof. In that respect attention is directed to the description hereinafter.

The support device 10 is adapted to be pivotable about the horizontal axis C relative to the carrier frame 7 of the apparatus.

Each of the two booms 3 has an end portion 16 arranged in opposite relationship to the mounting arrangement of the respective boom. The boom 3 is respectively adapted in that end portion (not shown) to receive a prolongation segment which is reciprocatingly pivotable between a transport position and a discharge position.

FIG. 2 shows a plan view from above on to an apparatus in accordance with a preferred embodiment of the invention, which is mounted to a tank vehicle 100. The tank vehicle 100 is in a position of negotiating a curve in the condition shown in FIG. 2. The apparatus 1 trails after the tank vehicle 100 by the booms 3 being respectively supported by the support device 10 and held in the respective supporting means 23. The transverse carrier 35 is mounted on the wheel box 33 pivotably about an axis E (see FIG. 1) and is arranged parallel to a plane in which the axes A1 and A2 of the booms 3 lie. That plane is also parallel to the pivotal frame 5 and the carrier frame 7. The booms 3 are oriented parallel to each other so that the support device 10 trails the booms 3 along behind the vehicle 100 in parallelogram-like fashion.

The pivotal movement of the apparatus 1 in conformity with the support device 10 is also indicated by arrows 20. The towbar 27 of the support device 10 is pivoted about the vertical axis B. Preferably, as shown in FIG. 2, the axis B extends in the same plane as the pivot axes A1 and A2.

The vehicle 100 has a longitudinal axis which is substantially parallel to the axis D about which the pivotal arm 5 is pivotable relative to the carrier arm.

The apparatus 1 according to the invention is shown in side views in FIGS. 3 and 4. FIG. 3 shows the apparatus 1 as a view from the rear (in the direction of forward travel of the vehicle) without the vehicle 100. FIG. 4 shows a side projection of the apparatus of FIG. 3 with two indicated operating conditions. In regard to the references which are identical in that respect, attention is directed to previous FIGS. 1 and 2. The displaceability of the apparatus 1 is also illustrated in FIGS. 3 and 4.

The booms 3 of the apparatus 1 are displaceable in respect of height in the direction of the arrows 30 relative to the vehicle 100. If the apparatus 1 or if in particular the respective booms 3 are moved upwardly in the illustrated orientation in the direction of the arrow 30 the support wheel 29 remains on the ground whereby the angle of the towbar 27 changes relative to the axis C and the rest of the apparatus 1. The booms 3 are released from the position in their respective supporting means 23 and moved in height along the guide 37. After the heightwise displacement has been completed the booms 3 are pivoted out of the transport position into the discharge position. Subsequently thereto or during same the support device 10 is pivoted upwardly about the axis C into a substantially vertical position. The support device 10 is thus moved towards the carrier frame 7 and the pivotal frame 5 so that the length of the assembly of vehicle 100 and apparatus 1 (see FIG. 2) is minimised.

The invention claimed is:

1. An apparatus for discharging a fertilizer in strips to agriculturally productive surfaces, comprising:
    trailing hoses with two booms which are respectively mounted to a pivotal frame pivotably about the vertical axis, each boom reciprocatingly pivotable about a respective vertical axis between a discharge position and a transport position, and wherein the two booms are pivotable about a horizontal axis in the discharge position,
    said apparatus having a support device which is arranged on the apparatus pivotably about a vertical axis and is adapted to support the two booms in the transport position in relation to a carriageway in a support portion spaced from the vertical axis
    wherein the support device is mounted pivotably about a horizontal axis, and wherein the support device is pivotable about the horizontal axis into a substantially vertical position when the two booms are outside the transport position,
    wherein the pivotal frame is mounted to a carrier frame pivotably about a horizontal axis.

2. Apparatus as set forth in claim 1 wherein the support device has a towbar pivotable about the vertical axis and in the support portion has one or more support wheels, a direction of travel of which is substantially parallel to a towing direction of the towbar.

3. Apparatus as set forth in claim 1 wherein the support device for each of the two booms has a respective supporting means for transmission of force of the booms to the one or more support wheels.

4. Apparatus as set forth in claim 1 wherein the support device of the two booms is mounted to a transverse carrier which is oriented substantially parallel to a plane in which axes of the booms lie.

5. Apparatus as set forth in claim 4 wherein the transverse carrier is adapted to be displaceable in respect of height.

6. Apparatus as set forth in claim 1 wherein in the transport position, the two booms are arranged substantially parallel to each other.

7. Apparatus as set forth in claim 1 wherein the two booms are movable in respect of height by means of a lifting device and in the transport position can be brought into contact with the support device by means of a lowering movement.

8. Apparatus as set forth in claim 7 wherein the support device has arresting elements with which the booms can be brought into engagement in the transport position by means of a lowering movement.

9. Apparatus as set forth in claim 1 wherein the booms respectively have a prolongation segment which is arranged at an end portion of the respective boom reciprocatingly pivotably between a transport position and a discharge position.

10. An apparatus for discharging a fertilizer in strips to agriculturally productive surfaces by means of trailing hoses with two booms which are each reciprocatingly pivotable about a respective vertical axis between a discharge position and a transport position, said apparatus having a support device which is arranged on the apparatus pivotably about a vertical axis and is adapted to support the two booms in the transport position in relation to a carriageway in a support portion spaced from the vertical axis
  wherein the support device is mounted pivotably about a horizontal axis, and wherein the support device is pivotable about the horizontal axis into a substantially vertical position when the two booms are outside the transport position, and
  wherein a lifting device is provided on a carrier frame and a pivotal frame is movable in respect of height relative to the carrier frame by means of the lifting device.

11. Apparatus as set forth in claim 10 wherein the support device has a towbar pivotable about the vertical axis and in the support portion has one or more support wheels, a direction of travel of which is substantially parallel to a towing direction of the towbar.

12. Apparatus as set forth in claim 10 wherein the support device for each of the two booms has a respective supporting means for transmission of force of the booms to the one or more support wheels.

13. Apparatus as set forth in claim 10 wherein the support device of the two booms is mounted to a transverse carrier which is oriented substantially parallel to a plane in which axes of the booms lie.

14. Apparatus as set forth in claim 13 wherein the transverse carrier is adapted to be displaceable in respect of height.

15. Apparatus as set forth in claim 10 wherein in the transport position, the two booms are arranged substantially parallel to each other.

16. Apparatus as set forth in claim 10 wherein the two booms are movable in respect of height by means of a lifting device and in the transport position can be brought into contact with the support device by means of a lowering movement.

17. Apparatus as set forth in claim 16 wherein the support device has arresting elements with which the booms can be brought into engagement in the transport position by means of a lowering movement.

18. Apparatus as set forth in claim 10 wherein the booms respectively have a prolongation segment which is arranged at an end portion of the respective boom reciprocatingly pivotably between a transport position and a discharge position.

* * * * *